Sept. 27, 1938.　　C. A. DESIMONE ET AL　　2,131,705
LIQUID DISPENSING APPARATUS
Filed Oct. 29, 1937　　5 Sheets-Sheet 1
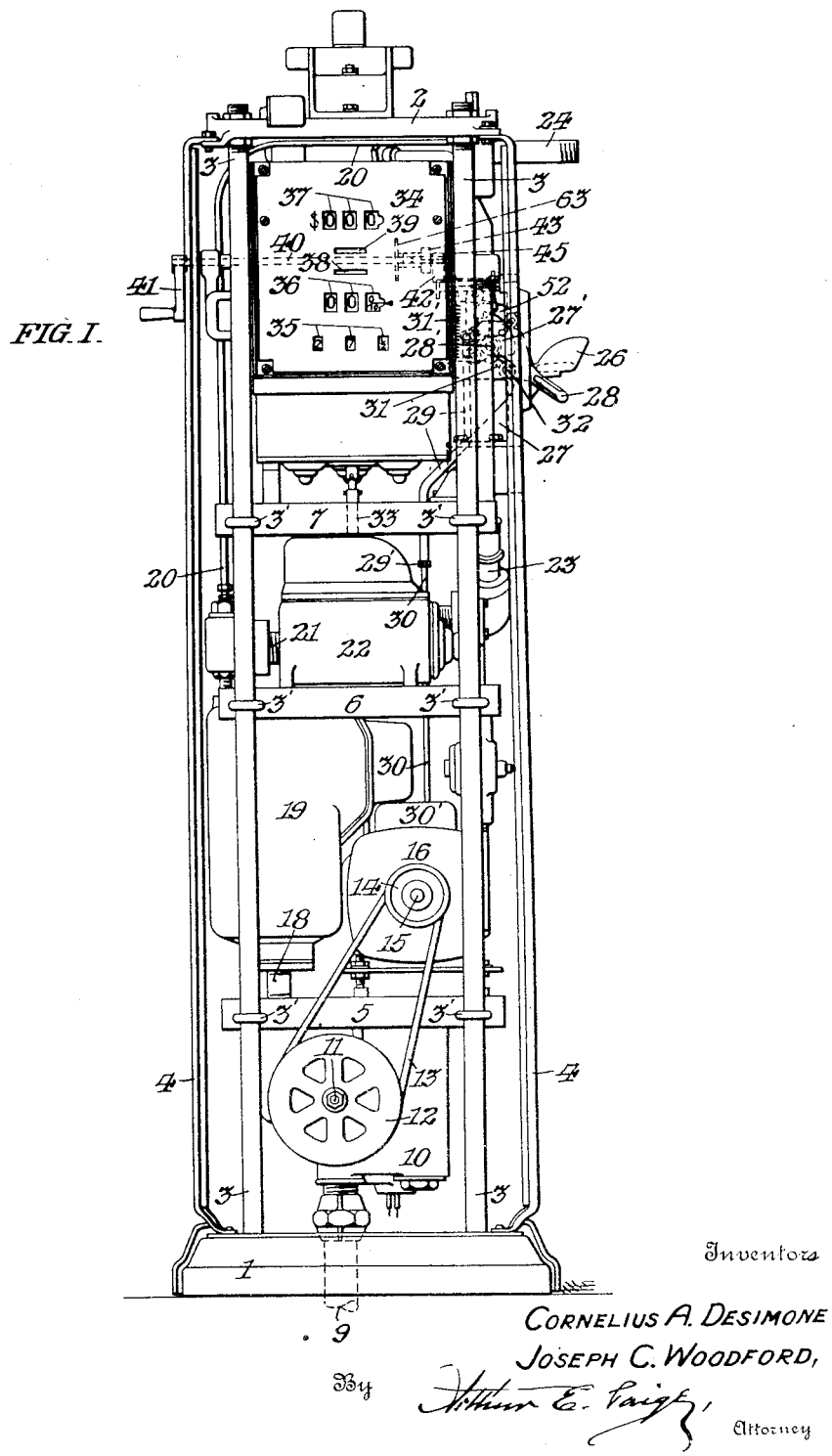
FIG. I.
Inventors
CORNELIUS A. DESIMONE
JOSEPH C. WOODFORD,
By Arthur E. Paige,
Attorney

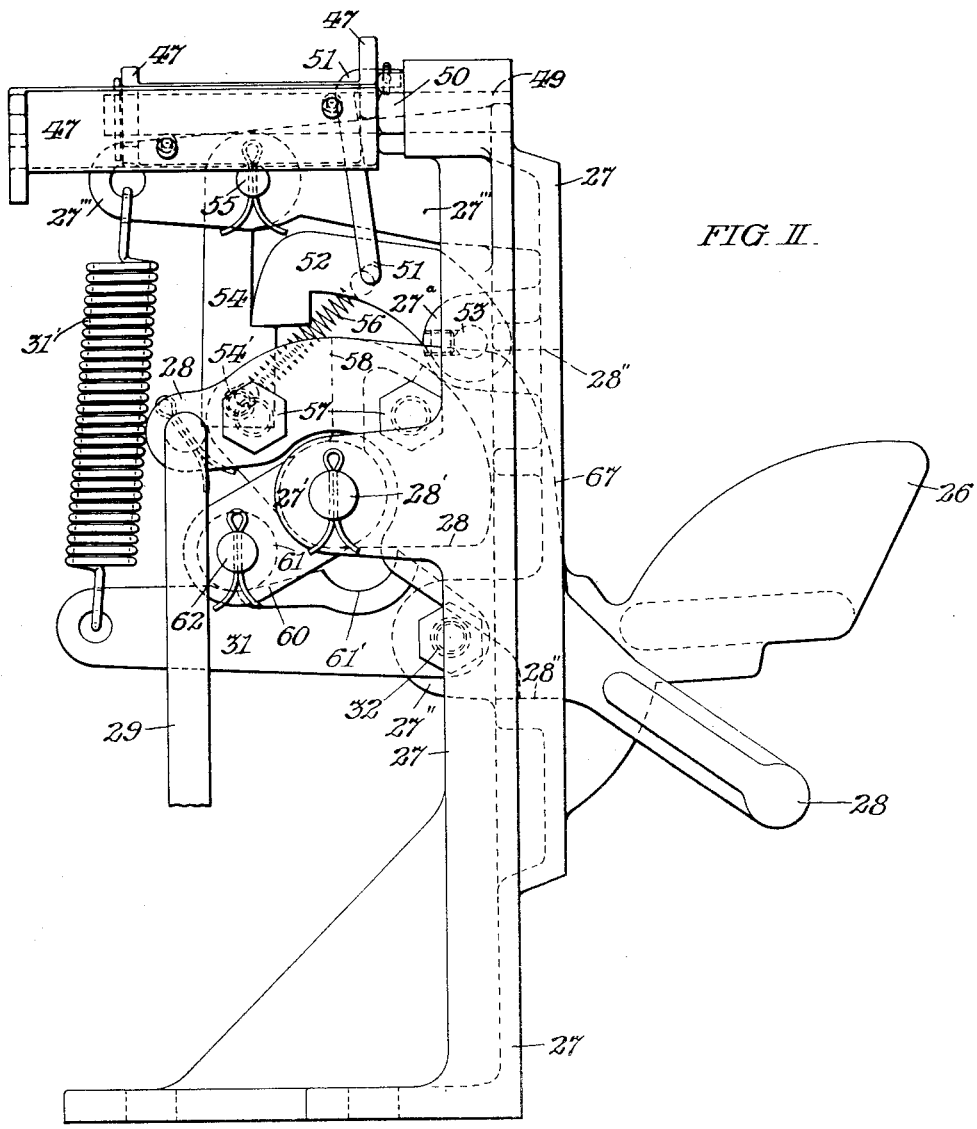

Sept. 27, 1938. C. A. DESIMONE ET AL 2,131,705
LIQUID DISPENSING APPARATUS
Filed Oct. 29, 1937 5 Sheets-Sheet 3
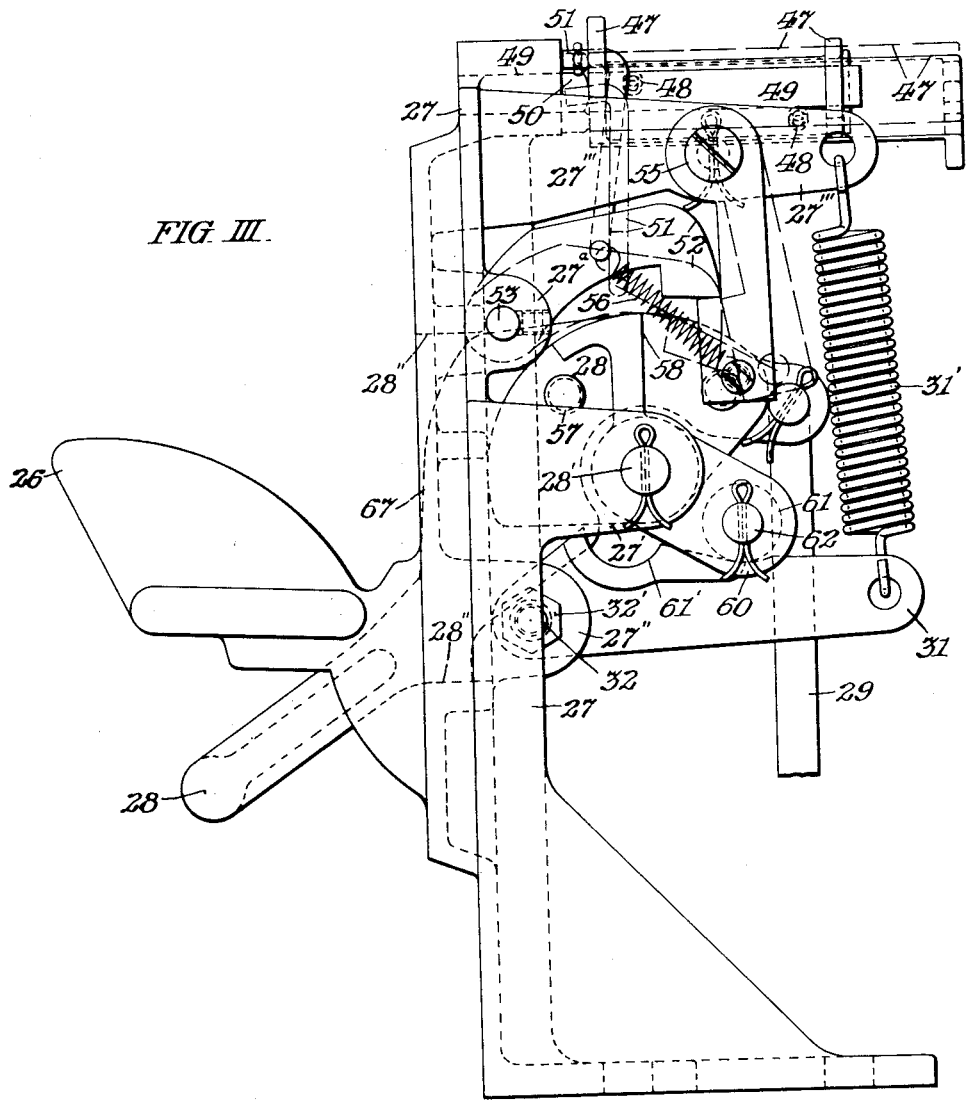
FIG. III.
Inventors
CORNELIUS A. DESIMONE
JOSEPH C. WOODFORD,
By Arthur E. Paigh,
Attorney Sept. 27, 1938.  C. A. DESIMONE ET AL  2,131,705
LIQUID DISPENSING APPARATUS
Filed Oct. 29, 1937  5 Sheets-Sheet 4
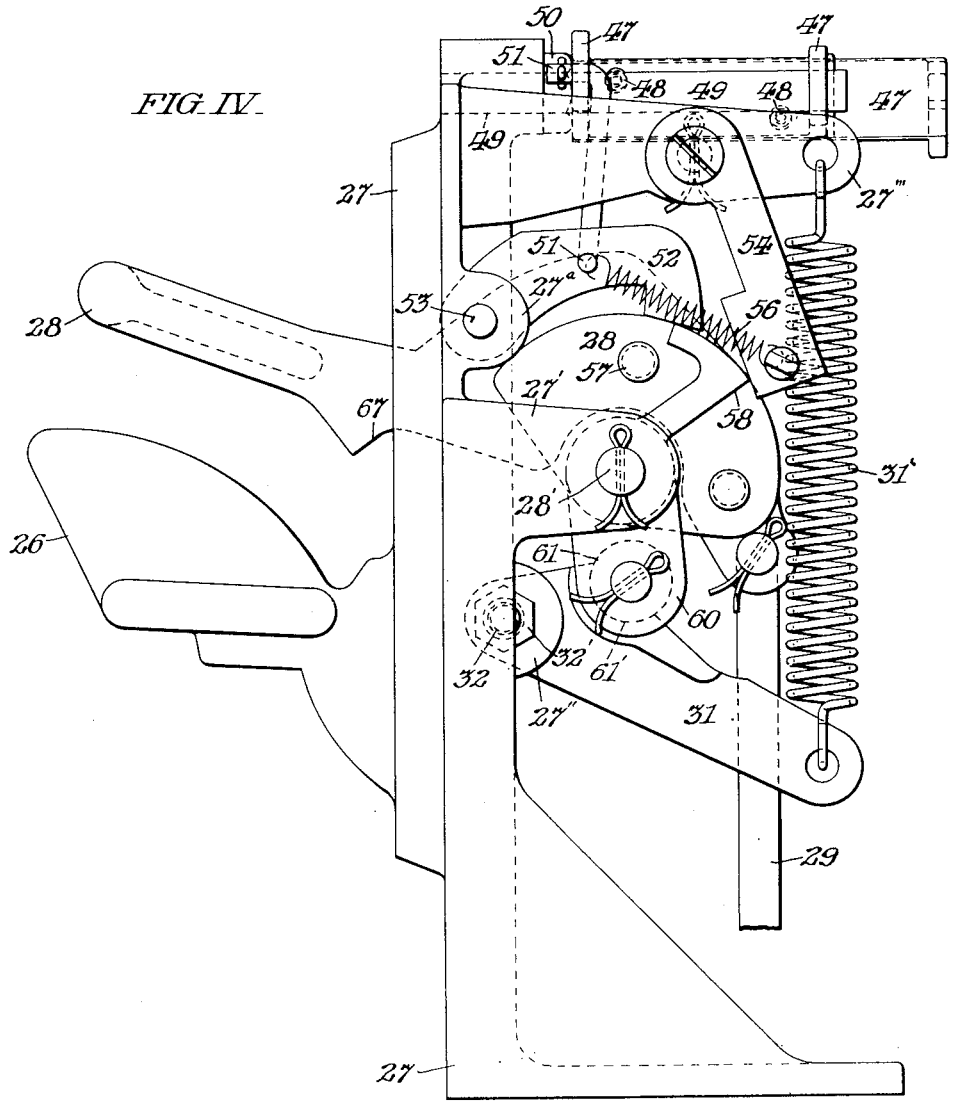
FIG. IV.
Inventors
CORNELIUS A. DESIMONE
JOSEPH C. WOODFORD,
By Arthur E. Paige,
Attorney

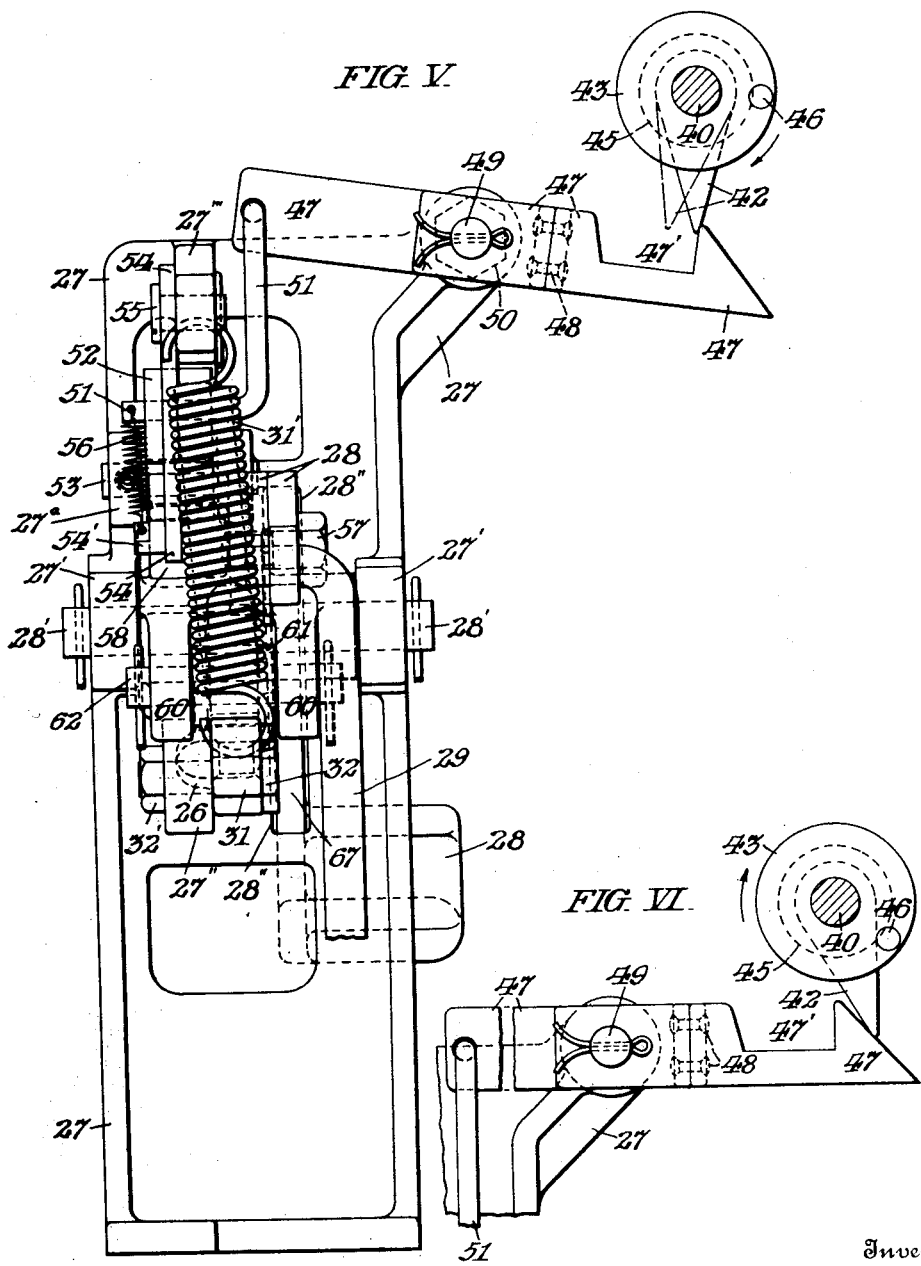

Patented Sept. 27, 1938

2,131,705

UNITED STATES PATENT OFFICE 2,131,705

LIQUID DISPENSING APPARATUS

Cornelius A. Desimone, Bala Cynwyd, and Joseph C. Woodford, Haverford, Pa., assignors to John Wood Manufacturing Company, Inc., Conshohocken, Pa., a corporation of Delaware Application October 29, 1937, Serial No. 171,652

10 Claims. (Cl. 221—95)

Our invention is particularly applicable to metering pumps for dispensing gasolene, including a hose through which the liquid is dispensed by means of a pump driven by an electric motor; a meter being included between the pump and hose and connected with means for indicating the volume of liquid dispensed through the meter; such indicating means comprising a circular series of numerals including zero. Such apparatus is ordinarily provided with an electric switch which may be manipulated by the dispensing operator to start and stop said motor, and also manually operative means for resetting the indicator to zero position. Moreover, it is usual to provide a switch operating lever which serves as a support for the hose between successive dispensing operations and which is operated by the weight of the hose to open the switch and stop the motor. However, unless means are provided to insure the return of the indicator to zero position between successive dispensing operations of such apparatus; an operator may accidentally or intentionally fail to reset the indicator to zero position and thus cheat the next customer to the extent that the indicator is left advanced with respect to its zero position.

Various means have been proposed to compel or induce the operator to zeroize the indicator of such apparatus between successive dispensing operations; varying from a mere sign on the apparatus warning the customer to be sure that the indicator is thus zeroized, to complicated locking means for mechanically locking the apparatus at the termination of one dispensing operation until it is unlocked by zeroizing the indicator to permit the next succeeding dispensing operation.

It is the object and effect of our invention to provide simplified locking means for the purpose last above described, and preferably in the form of a unitary structure adapted for installation in liquid dispensing apparatus of several commercial forms which are not provided with any such means for insuring that the indicator shall be thus zeroized.

In the form of our invention chosen for illustration herein, the hook element for supporting the hose in idle position is immovable and the motor switch is connected with and controlled by what we term a lock lever which cannot be used to hold the switch closed, unless and until the indicator is zeroized by complete operation of the means for manually resetting the indicator to zero position; whereupon the switch may be closed by said lock lever, and is then held closed by a spring stressed switch detent lever, until released by manual operation of said lock lever.

Our invention includes the various novel features of construction and arrangement hereinafter more definitely specified.

In said drawings, Fig. I is a front elevation of a metering pump of what is known as the curbstand type for dispensing gasolene and including a convenient embodiment of our invention.

Fig. II is an elevation on a larger scale of the mechanism including the hook support and lock lever as shown projecting at the right hand side of Fig. I.

Fig. III is an elevation of the opposite side of the mechanism as shown in Fig. II.

Fig. IV is an elevation similar to Fig. III but with the parts of the mechanism in a different position.

Fig. V is an elevation of the mechanism as seen from the left hand side of Fig. II and right hand side of Fig. III, showing the indicator resetting shaft carrying the cam dog in cooperative relation with the cam lever of the mechanism shown in Figs. II and III.

Fig. VI is a fragmentary elevation of parts of the mechanism shown in Fig. V, but in a different position.

Referring to Fig. I, the liquid dispensing apparatus is mounted in the housing which is adapted to be fixed upon a pavement or platform at a curb or driveway and includes the cast metal base member 1 and top member 2 which are substantially rectangular and connected at their corners by four cylindrical standards 3, and four channel bars 4 which will serve to support a thin sheet metal casing which is omitted from the drawings, but which includes four substantially flat panels extending vertically upon the four sides of the housing. Said frame standards 3 are also cross-connected by transverse frame members 5, 6, and 7, rigidly connected therewith by U-bolts 3'.

The liquid to be dispensed is conveniently stored in an underground tank from which it is elevated through the pipe 9 by the operation of the pump 10. Said pump includes a rotor having the shaft 11 with the grooved pulley 12 connected by the belt 13 with the grooved pulley 14 on the shaft 15 of the electric motor 16, which is supported by said transverse frame member 5. The liquid is discharged from said pump 10 through the conduit 18 into the receptacle casing 19 in which air and vapor entrained in the liquid are eliminated from the liquid and discharged through the outlet conduit 20 which extends to the top of the frame, from which the eliminated fluid is discharged. The liquid passes from said casing 19 through the conduit 21 to the meter 22 from which it is discharged through the conduits 23 and 24. The conduit 24 is connected with a flexible dispensing hose having the usual valve controlled nozzle at its discharge end.

The hook 26, shown in Figs. II, III and IV, is a rigid part of the bracket 27, which is rigidly connected with said transverse frame member 7, and is provided to support the hose nozzle in idle position. The lock lever 28 is fulcrumed on the shaft 28' which is held in the pair of bearing lugs 27' on said bracket 27. Said lock lever 28 is pivotally connected with the vertically reciprocatory link 29 which is adjustably connected, by the coupling 29' shown in Fig. I, with the switch rod 30 for operating said switch in the box 30'.

The switch detent lever 31 is fulcrumed on the stud 32 fixed in the single bearing lug 27'' on said bracket 27, by the jam nut 32'. Said lock lever 28 and switch rod 30 are continually stressed toward the open position of said switch by said detent lever 31, under stress of the spring 31' extending from the inner end of said detent lever 31 to the arm 27''' on said bracket 27. Movement of said lock lever 28 by said spring 31' is limited by contact of the under side of said lock lever with the bottom of the slot 28'' in said bracket 27, through which said lever extends as shown in Figs. II and III.

As shown in Fig. I; the shaft 33 which is turned by the mechanism of the meter 22 drives computing registering mechanism including series of decimally numbered wheels comprising indicating mechanism covered by the face plate 34. Said face plate 34 has windows 35 for displaying numerals representing the price of gasolene. The numerals displayed at said window 35 indicate the price of gasolene to be twenty-seven and one-half cents per gallon. Said indicator has windows 36 for displaying numerals representing the quantity of gasolene dispensed but, as the indicator is in zero position that fact is indicated by the ciphers displayed. Said indicator has windows 37 for displaying numerals representing the value of the liquid dispensed at a single dispensing operation but, as the indicator is in zero position that fact is manifested by the ciphers shown in said windows. Said indicator has the single window 38 for display of numerals of a total adder representing the total quantity of liquid which has been dispensed and has the single window 39 for display of numerals of a total adder of the value of all of the liquid which has been dispensed. In the form of our invention shown the indicator is provided with manually movable shutters which are normally closed so that the totals indicated by the adders behind the windows 38 and 39 are not visible.

The shaft 40 projecting at the left hand side of Fig. I may be engaged by the removable crank 41, in the custody of the operator, for resetting the indicating mechanism to the zero position shown, by rotation of said shaft 40 clockwise as seen from the left hand side of Fig. I; and as seen in Figs. V and VI.

Referring to Figs. I, V, and VI; loosely hung upon the resetting shaft 40 near its right hand end, is the cam dog 42 between the collars 43 and 45 which are fixed on said shaft. Said collar 43 has the pin 46 rigidly connected therewith, projecting toward the collar 45 and in the path of said dog 42. Normally, that is to say, when the indicator is not being reset and the apparatus is in condition for dispensing liquid, said dog hangs vertically, as shown in Fig. V, and the shaft 40 is in the rotary position shown in said figure and the pin 46 is out of engagement with said dog 42. In that position, the point of the dog hangs in the notch 47' of the cam lever 47, as shown in Fig. V. Said lever 47 is conveniently formed of two pieces rigidly connected by rivets 48. The piece having the notch 47' is L-shaped and the other piece U-shaped. The bifurcations of the latter, one of which is longer than the other, are both hung on the fulcrum shaft 49 which is a stud screwed into said bracket 27 at one end and secured by the jam nut 50. The longer bifurcation of said cam lever 47 has pivotally connected therewith the upper end of the pendent link 51, as shown in Figs. II and V. Said link 51 is pivotally connected at its lower end with the latch 52 which is pivoted on the pin 53 fixed in said bracket 27 and extending between the two lugs 27ª which are part of said bracket 27. In the normal position shown in Figs. I, II, and III, said latch 52 is engaged and upheld by the latch 54 which is hung on the stud 55 fixed in said arm 27'''' of the bracket 27. The spring 56 which extends from the lower end of said link 51 to the stud 54' on said latch 54 continually stresses said latch 54 toward its position of engagement with said latch 52.

Said lock lever 28 is conveniently formed of two pieces which are rigidly connected by the cap screws 57; the piece which includes the hub encircling the fulcrum shaft 28', having, in unitary relation therewith, the abutment 58 for engagement by said latch 52 when the latter is released from the latch 54. When said lock lever 28 is thus engaged by the latch 52; the lock lever is inoperative. However, in the position shown in Figs. II and III, the mechanism is in position to be manipulated by the operator, to move it to the position shown in Fig. IV, the latter being the position in which the motor switch is closed, by upward movement of the outer end of said lock lever 28 and consequent downward thrust of the link 29, to initiate a dispensing operation. The piece of said lock lever 28 having the abutment 58 thereon also has two arms 60 carrying between them the lock roller 61 which is journaled on the shaft 62. In the normal idle position shown in Figs. II and III said roller 61 serves as a stop limiting the upward movement of the switch detent lever 31 under stress of the spring 31' which then holds the outer end of said lock lever 28 in its lowermost position in which the motor switch is open.

To move the parts from the normally idle position shown in Figs. II and III to the dispensing position shown in Fig. IV; the operator pushes up the outer end of said lock lever 28 to the position shown in Fig. IV; thus pushing down the switch operating link 29 to the position shown in Fig. IV, in which the switch is closed. During that movement, said abutment 58 on the lock lever 28 strikes the lower portion of said latch 54 and thrusts it, clockwise in Fig. II, out of engagement with the latch 52, and the successive turning movement of said lock lever 28 thrusts the detent lever 31 downward, stretching said spring 31', until the roller 61 is engaged in the locking recess 61' in said switch detent lever 31, as shown in Fig. IV; in which position the switch is held closed, against the stress of the spring 31', by said lock lever 28 and its roller 61.

When the dispensing operation is concluded; the operator may stop the motor and pump by manually depressing the outer end of said lever back to the position shown in Figs. II and III. However, such manual movement of the lock lever 28 does not otherwise restore the mechanism to the normal idle position shown in Figs. II and III, because as shown in Fig. IV, the latch 52 is not only released from engagement with the latch 54 but stressed by said spring 56 so that when said lever 28 is pulled down at its outer end to the position shown in Figs. II and III, the abutment 58 on the lock lever 28 is instantly engaged by said latch 52 so that said lock lever 28 is locked and cannot be uplifted at its outer end to close said switch.

That downward movement of the latch 52 by the spring 56 tilts said cam lever 47 from the position shown in Fig. V to the position shown in Fig. VI, incidentally idly turning the loose dog 42 to the position indicated in dash lines in Fig. V. The mechanism remains thus locked, to prevent any dispensation of liquid until said indicator resetting shaft 40 is manually turned, clockwise, from its normal idle position shown in full lines in Fig. V, more than a complete revolution. Such movement causes the pin 46 to pick up the loose dog 42 and carry it over to the position shown in Fig. VI, in which the dog is presented against the right hand inclined end of said cam lever 47 so that continued movement of said shaft, clockwise, from the position shown in Fig. VI to the position shown in dash lines in Fig. VI, causes said cam dog 42 to depress the outer end of said cam lever 47 to its normal position shown in Fig. V. In its movement from the position shown in Fig. VI to the position shown in Fig. V, said cam lever 47 lifts the link 51 and latch 52 until the free left hand end of the latch 52, shown in Fig. II, is above the shoulder of the latch 54 and the latter is snapped, by its spring 56, into engagement with said latch 52 as shown in Fig. II to thereafter uphold it and permit the lock lever 28 to be manipulated to close the switch as above described.

As above noted, said resetting shaft 40 is turned more than a complete revolution from its normal position shown in Fig. V to effect the resetting of the indicator mechanism behind the plate 34, to its zero position, by the gear 63, on said shaft 40, shown in Fig. I; incidentally resetting the cam lever 47 from the position shown in Fig. VI to the position shown in Fig. V. However, the indicating mechanism, like that disclosed in Letters Patent of the United States No. 2,106,686, granted to the present applicant Woodford January 25, 1938, includes a spring which returns the shaft 40, counter-clockwise with reference to Fig. V, approximately forty-five degrees, leaving the pin 46 in the position shown in Fig. V. However, the specific means for connecting said resetting shaft 40 with said indicating mechanism is not herein claimed.

As shown in Fig. I, the lock lever 28 projects into the outer atmosphere through the sheet metal casing inclosing the metering pump mechanism and, consequently, the right hand face of the bracket 27 as shown in Fig. II is exposed to wind, rain, and snow. Therefore, it is desirable to have the slot 28″ through which said lever projects fit the lever as closely as possible, both in the position shown in Fig. II and in the position shown in Fig. IV. Therefore, we provide the web 67 on the lever 28 for that purpose. It may be observed with reference to Figs. II and III that the web 67 fits closely in said slot 28″ when in the normal idle position so that said slot is then substantially closed.

Said latch 52 is in fact a detent movable to alternately detain and release the lock lever 28. The pin 46 carried by said shaft 40 is in fact a crank, and it and the dog 42 carried by said shaft 40 constitute rotary eccentric releasing means for said detent means. The cam lever 47 and the means for connecting it with said detent and operating the latter, constitute automatically operative controlling means connecting said lock lever 28 with the resetting means comprising the shaft 40 and means for manually turning it. However, other suitable detent and releasing means may be employed.

Therefore, we do not desire to limit ourselves to the precise details of construction and arrangement or method of operation herein set forth, as it is obvious that various modifications may be made therein without departing from the essential features of our invention as defined in the appended claims.

We claim:

1. In liquid dispensing apparatus, the combination with a pump operated by an electric motor; of a switch in said motor circuit; an indicator for manifesting the volume of liquid dispensed and movable with respect to a zero position; switch controlling means, including a manually operative lock lever for closing said switch, detent means for preventing operation of said lock lever unless and until said indicator is reset to zero position after a dispensing operation, including a latch for engaging said lock lever, a cam lever, and a link connecting said latch with said cam lever; and manually operative means for resetting said indicator to zero position, including a rotatable shaft and a cam relatively rotatable on said shaft and operatively related to said cam lever; whereby said detent is released, by rotation of said cam, only when said indicator is reset to zero, by rotation of said shaft.

2. In liquid dispensing apparatus, the combination with a pump operated by an electric motor, of a switch in said motor circuit; an indicator for manifesting the volume of liquid dispensed and movable with respect to a zero position; switch controlling means, including a manually operative lock lever for closing said switch, detent means for preventing operation of said lock lever unless and until said indicator is reset to zero position after a dispensing operation, including a latch for engaging said lock lever, a cam lever, and a link connecting said latch with said cam lever, a second latch for engaging the first mentioned latch, and a spring connecting and continually stressing said two latches toward their engaged position; and manually operative means for resetting said indicator to zero position, including a rotatable shaft and a cam on said shaft operatively related to said cam lever; whereby said detent is released, by rotation of said cam, only when said indicator is reset to zero, by rotation of said shaft.

3. The combination with an electric switch, of switch controlling means, including a manually operative lock lever for closing said switch, detent means for preventing operation of said lock lever; and means for releasing said detent means, including a manually rotatable shaft, carrying a rotatable eccentric, loosely journaled on said shaft and operatively related to an element of said detent means; and a crank pin rigidly connected with said shaft and operatively related to said eccentric; whereby said detent is released only when said shaft and eccentric have been turned to a predetermined extent.

4. The combination with an electric switch, of switch controlling means, including a manually operative lock lever for closing said switch, detent means for preventing operation of said lock lever, including a latch for engaging said lock lever, a cam lever, and a link connecting said latch with said cam lever; and means for releasing said detent means, including a manually rotatable shaft, loosely carrying a relatively rotatable eccentric, operatively related to an element of said detent means; whereby said detent is released only when said shaft and eccentric have been turned to a predetermined extent.

5. The combination with an electric switch, of switch controlling means, including a manually operative lock lever for closing said switch, detent means for preventing operation of said lock lever, including a latch for engaging said lock lever, a cam lever, and a link connecting said latch with said cam lever; a second latch for engaging the first mentioned latch, and a spring connecting and continually stressing said two latches toward their engaged position; and means for releasing said detent means, including a manually rotatable shaft, carrying a rotatable eccentric, operatively related to an element of said detent means, whereby said detent means is released only when said shaft and eccentric have been turned to a predetermined extent.

6. Mechanism as in claim 5, wherein the rotatable eccentric includes a cam dog loosely journaled on said shaft, and a crank carried by said shaft for picking up and turning said dog with said shaft.

7. The combination with an electric switch, of switch controlling means, including a reciprocatory rod directly connected with a manually operative lock lever for closing said switch, detent means for preventing operation of said lock lever, including a latch for engaging said lock lever, a cam lever, and a link connecting said latch with said cam lever; and means for releasing said detent means, including a manually rotatable shaft, loosely carrying a relatively rotatable eccentric, operatively related to an element of said detent means; whereby said detent is released only when said shaft and eccentric have been turned to a predetermined extent.

8. The combination with an electric switch, of switch controlling means, including a reciprocatory rod directly pivotally connected with a manually operative lock lever for closing said switch, detent means for preventing operation of said lock lever, including a latch for engaging said lock lever, a cam lever, and a link connecting said latch with said cam lever; a second latch for engaging the first mentioned latch, and a spring connecting and continually stressing said two latches toward their engaged position; and means for releasing said detent means, including a manually rotatable shaft, carrying a rotatable eccentric, operatively related to an element of said detent means, whereby said detent is released only when said shaft and eccentric have been turned to a predetermined extent.

9. In a control device for liquid dispensing apparatus, the combination of a meter having a registering mechanism, means for resetting the mechanism to zero position, means for delivering liquid through the meter, including a pump and an electric switch controlling the operation of said pump; said meter having a liquid discharge conduit terminating in a nozzle; a stationary support for the nozzle when not in use; switch controlling means, including a manually operative lock lever for closing said switch; said lock lever being operable independently of said hose support; detent means for preventing operation of said lock lever, including a latch for engaging said lock lever, a cam lever, and a link connecting said latch with said cam lever; a second latch, for engaging the first mentioned latch, both of said latches being operable independently of said hose support; a spring connecting and continually stressing said two latches toward their engaged position; and means for releasing said detent means, including a manually rotatable shaft, for resetting said register to zero position; a rotatable eccentric, journaled on said shaft, and alternately movable by and independently of said shaft, said eccentric being operatively related to an element of said detent means, whereby said detent means is released only when said shaft and eccentric have been turned to an extent sufficient to zeroize said register.

10. Mechanism as in claim 2, wherein the rotatable eccentric includes a cam dog loosely journaled on said shaft, and a crank rigidly connected with said shaft for picking up and turning said dog with said shaft, in cooperative relation with said cam lever.

CORNELIUS A. DESIMONE.
JOSEPH C. WOODFORD.